United States Patent [19]

Grant et al.

[11] Patent Number: 5,478,376

[45] Date of Patent: Dec. 26, 1995

[54] METHOD FOR THE SEPARATION OF RHODIUM AND/OR IRIDIUM FROM SOLUTION

[75] Inventors: Richard A. Grant; Christopher S. Smith, both of Reading, United Kingdom

[73] Assignee: Matthey Rustenburg Refiners (PTY) Limited, Johannesburg, South Africa

[21] Appl. No.: 341,179

[22] Filed: Nov. 18, 1994

[30] Foreign Application Priority Data

Sep. 21, 1994 [GB] United Kingdom .................... 9418967

[51] Int. Cl.$^6$ ....................................................... C22B 3/20
[52] U.S. Cl. ................................................. 75/722; 423/22
[58] Field of Search .................................. 423/22; 75/722

[56] References Cited

FOREIGN PATENT DOCUMENTS 2247888  3/1992  United Kingdom ..................... 423/22

Primary Examiner—Melvyn Andrews
Attorney, Agent, or Firm—Cushman Darby & Cushman

[57] ABSTRACT

A method for the separation of rhodium and/or iridium from a solution containing ruthenium said method comprising the steps of having a rhodium chloride complex in oxidation state III, converting the ruthenium to nitrosyl complexes in divalent states and recovering rhodium and/or iridium.

8 Claims, No Drawings

METHOD FOR THE SEPARATION OF RHODIUM AND/OR IRIDIUM FROM SOLUTION

This invention concerns improvements in refining, more especially it concerns improvements in the separation of certain platinum group metals such as rhodium and/or iridium from solution.

It is known that platinum group metals ("PGMs") may be separated by solvent extraction and selective precipitation. Because of the similarity of the PGMs, this process is difficult and lengthy and has to be accomplished in a set order to avoid severe cross-contamination of the metals. The feedstock to such refining processes may be a feedstock derived from mining operations or from the recycling of PGM values, or a combination thereof, and may be contaminated with base metals such as nickel, and the other precious metals, gold and/or silver.

The metal rhodium is one of the most difficult to refine by separation from the other PGMs, and is usually the last metal to be recovered from a mixed PGM feedstock (see, for example, EP 0 049587A). Because of this, the relatively low availability of rhodium and the industrial demand, especially for automobile catalytic converters, rhodium is particularly expensive. It is desirable to devise a process which permits the recovery of rhodium from mixtures thereof with other PGMs and especially from mixtures with other PGMs and base metals and possibly other precious metals. Reference is made to The Pt Supplement Vol A1 of Gmelin, published 1986, which suggests that the hexachloro complex $RhCl_6^{3-}$ can be precipitated in fairly selective manner, and that the use of ethylenediamine gives "very much better yields" than ammonia to precipitate the complex. We have studied ethylenediamine as a reagent for rhodium precipitation and concluded that the selectivity and yields were not adequate for a commercial scale operation.

An improved method for recovery of certain PGMs from a feedstock solution is disclosed in GB 2247888B. The method comprises mixing a polyamine having three or more amino nitrogen atoms with a feedstock solution. The PGM which is required to be separated from the solution is present in the feedstock as the chloride complex and is in oxidation state III. A protonating agent such as hydrochloric acid is also present in the feedstock solution. An oxidant oxidises PGMs to oxidation state IV so that these PGMs remain in solution whilst the selected PGM is precipitated out.

Although this method improved the purity of the PGM recovered there still remained a need for greater purity of recovered rhodium. This is because when the oxidation state of ruthenium is manipulated from III to IV it forms a mixture of $[RuCl_6]^{2-}$ and $[Ru_2OCl_{10}]^{4-}$. The polyamine salt of $[Ru_2OCl_{10}]^{4-}$ has a low solubility and so can co-precipitate with the rhodium decreasing the purity.

It is known that ruthenium forms numerous complexes with nitric acid many of which are stable and remain unchanged through various substitution and oxidation-reduction reactions. The group RuNO is contained in ruthenium nitrosyl complexes and almost all ligands can be associated with it. One example of such a complex is $K_2[RuNocl_5]$ where the ruthenium chloro-complex is in a divalent state. The complexes can be prepared in a variety of ways. One example is the precipitation of the salt $(NH_4)_2[RuNOCl_5]$ here a solution of nitric acid, ruthenium tetroxide and approximately 8M hydrochloric acid is evaporated and the salt precipitated by adding ammonium chloride.

This property of ruthenium forming stable nitrosyl complexes has been exploited in the separation and purification of ruthenium from solution and which is disclosed in GB 1533541. The solution, from which ruthenium is extracted, contains platinum group metals and base metals. The method converts ruthenium to a ruthenium nitrosyl chloro-complex. The other platinum group metals are or remain as chloro-complexes which have properties distinct from the ruthenium nitrosyl chloro-complex and thus the method allows selective separation of the ruthenium complex (in divalent state) from solution.

This ruthenium nitrosyl chloro-complex has been found to provide a surprisingly useful intermediate step in the separation of rhodium because of the stability of the divalent complex.

The aim of the present invention is to improve the purity of the separation of certain PGMs such as rhodium from a feedstock solution containing for example ruthenium, iridium and base metals.

The present invention provides a method for the separation of rhodium and/or iridium from a feedstock solution containing at least a ruthenium chloro-complex, hydrochloric acid and rhodium and/or iridium chloro-complexes, said method comprising converting the ruthenium chloro-complex to a nitrosyl complex in divalent state, and precipitating rhodium and/or iridium by manipulation of their oxidation states. Alternative sources of chloride can be derived from mineral salts in the presence of hydrochloric acid which acts as a protonating agent. A treatment with concentrated HCl ensures that rhodium and iridium are present as chloro-complexes.

The advantage of this method is that an improved purity of rhodium and/or iridium is separated from the feedstock solution.

Suitably ruthenium is converted to the nitrosyl complex by treating the solution with formic acid, subsequently adding nitric acid, heating the solution to reflux, refluxing for 3 hours and treating with concentrated hydrochloric acid. This stage ensures the complete conversion of ruthenium to the nitrosyl complex.

Preferably rhodium and/or iridium chloro-complexes are present in oxidation state III and are precipitated by complexing with a polyamine ligand.

Suitably a first rhodium precipitation is achieved by converting iridium(III) to iridium(IV), heating the solution, adding to the solution a polyamine in 6N hydrochloric acid with an oxidising agent, cooling the solution to ambient temperature and filtering a rhodium salt from the solution.

A suitable polyamine is DETA $[(H_2NCH_2CH_2NH_2CH_2CH_2NH_2)]$. Alternative polyamines, as disclosed in UK patent GB 2247888 B, include triethylene tetramine, tetraethylene pentamine, pentaethylene hexamine, aminoethyl piperazine, iminobispropylamine, N-methyl dipropylene triamine and N,N'-dimethyl-N,N'-(bis aminopropyl) ethylene diamine.

Iridium(III) as $[IrCl_5(H_2O)]^-$ may be converted to Ir(IV) by oxidation with an oxidising agent, especially hydrogen peroxide. On oxidation to the tetravalent state iridium is retained in solution. Hydrogen peroxide is preferred over a mineral acid because it is an oxidant whereas mineral acids do not necessarily act as oxidising agents. The importance of this step is to remove any remaining iridium to prevent it from contaminating the separation of rhodium.

The advantage of this method is that ruthenium is converted to the ruthenium nitrosyl chloro-complex which is in a divalent state and is not precipitated by the rhodium precipitation process, thus allowing a greatly improved purity of separated rhodium.

Preferably the rhodium precipitation is carried out at an elevated temperature for 1 hour. The reaction solution may be cooled to ambient temperature with the addition of hydrogen peroxide during precipitation. This step gives a precipitate with larger particle size which is easier to filter and wash. The purity of rhodium recovered is greater than 99.99% as against 20% in the feedstock.

The invention will be described by way of example which is to be regarded as illustrative and in no way limiting of the invention.

EXAMPLE 1

Platinum raffinate (a feedstock solution) contains a rhodium concentration of 1.85 gl$^{-1}$, an acidity of 1M and other metals at various concentrations. The raffinate was evaporated to a rhodium concentration of 55 gl$^{-1}$ which resulted in an increase in acidity to 6M. The acidity was adjusted by diluting the raffinate with water to give a final rhodium concentration of 20 gl$^{-1}$, a ruthenium concentration of 30 gl$^{-1}$ and 1.5M free HCl.

To this solution was added 17.51 liters of formic acid solution in a molar ratio of 1:3 ruthenium:formic acid. The solution was refluxed for 1 hour and during this stage 14.7 liters of nitric acid was added in a molar ratio of 1:1.5 ruthenium:nitric acid. The solution was further refluxed for 3 hours during which time various ruthenium complexes were produced for example $[Ru(NO)Cl_5]^{2-}$ and $[Ru(NO)Cl_4(H_2O)]^-$ in the ratio of 2:1. Waste products of this reflux include carbon dioxide, excess formic acid and nitrogen oxides which could be removed for example by scrubbing.

There were present in the rhodium-containing solution, complexes of iridium for example $[IrCl_6]^{3-}$ and $[IrCl_5(H_2O)]^{2-}$. Both iridium and rhodium can form nitrosyls and these are converted back to the chloro-complexes by acidifying and then boiling. Ruthenium remains as the nitrosyl complex. The rhodium was present at a concentration of 20 gl$^{-1}$ in 6N HCl.

The next stage was oxidation of Ir(III) to Ir(IV), to prevent it co-precipitating with rhodium-DETA and was achieved by using, for example, a 1% solution of hydrogen peroxide which was added at a uniform rate. Once this reaction was complete, DETA in 6N HCl was added to the rhodium-containing solution over a 1 hour period at a "simmer" temperature of 103°–105°C. The solution was cooled and during this cooling, to approximately 25° C., an approximately 1% hydrogen peroxide solution was added. A Rh-DETA salt was precipitated which was filtered and washed. The first three washes used were 6M HCl/DETA and the fourth was H$_2$O/DETA (at half the volume of the previous washes). The remaining mother-liquor contained the ruthenium nitrosyl chloro-complex, iridium in an oxidation state IV and base metals.

Comparative experiments were performed. In Example A precipitation of rhodium in the presence of ruthenium was performed without the nitrosylation step. In Example B the nitrosyl step was included in the process yielding a significantly improved separation.

EXAMPLE A

A. Acidity Adjustment

The platinum raffinate contained only 4.6M acid whilst the optimum acidity for DETA precipitation is ca 6M. It was therefore concentrated by evaporation and then back-diluted with acid to increase the acidity; Pt raffinate (250 ml, 4.58M acid, 20.7 gl$^{-1}$ Rh) was evaporated down to 176 ml and then adjusted to ca 6M acid, 20 gl$^{-1}$ Rh and 30 gl$^{-1}$ Ru by the addition of 42 ml of concentrated hydrochloric acid and 32 ml water.

B. Oxidation

The raffinate was oxidised to convert both iridium and ruthenium to oxidation state IV to minimise co-precipitation.

The adjusted raffinate (225 ml) was heated to reflux and oxidised by the addition of 7.2 ml hydrogen peroxide (100 vol) over a period of 3 hours. The redox potential at the end was 930 mV relative to a saturated calomel reference electrode indicating complete oxidation.

C. DETA Precipitation

The oxidised platinum raffinate (200 ml) was heated and 1.3× the stoichiometric amount of DETA trihydrochloride solution required to precipitate the rhodium was added over a period of 1 hour (51.9 ml of 207.23 gl$^{-1}$ DETA trihydrochloride in 6M hydrochloric acid). The slurry was then allowed to cool to room temperature. Hydrogen peroxide (100 vol) was added at the rate of 2 ml per hour throughout the precipitation and subsequent cooling to maintain oxidation. The precipitate was filtered and washed four times with acid (6M hydrochloric acid, 55 ml) and then once with water (25 ml). The washed precipitate was dissolved in Aqua Regia and analysed by ICP. The precipitate contained 15.9% ruthenium as a percent of the rhodium present (159,000 ppm ruthenium).

EXAMPLE B

A. Raffinate Evaporation

The nitrosylation reaction requires that the hydrochloric acid concentration is below 1.5M to work efficiently.

Platinum raffinate (1000 ml) from the same batch as was used in Example A was evaporated down to 378 ml and then back-diluted with water. The hydrochloric acid concentration determined by titration was 1.44M.

B. Nitrosylation

Formic acid (51.5 g) was added to the adjusted raffinate and it was then heated to reflux. Nitric acid (46 g) approximately (normal concentration) was then added over a period of 1 hour. Following the addition, the mixture was allowed to reflux for a further 3 hours. Concentrated hydrochloric acid (750 ml) was then added and the solution refluxed for 3 hours in order to decompose any rhodium or iridium nitrosyl complexes formed back to the chloro complexes. The liquor was then evaporated back to ca 1000 ml to bring the rhodium concentration up to 20 gl$^{-1}$ ready for precipitation.

C. Oxidation

The feed was oxidised to convert iridium(III) to iridium(IV) so that it did not co-precipitate.

The nitrosylated platinum raffinate (780 ml) was heated to reflux and hydrogen peroxide (100 vol, 8.5 ml) added over a period of 3 hours. The final redox potential was 840 mV relative to a saturated calomel reference electrode indicating that the iridium was fully oxidised.

D. Precipitation

The oxidised raffinate (250 ml) was heated to reflux and 1.3× the stoichiometric amount of DETA trihydrochloride solution required to precipitate the rhodium was added over a period of 1 hour (68.9 ml of 180.7 gl$^{-1}$ DETA trihydrochloride in 6M hydrochloric acid). The slurry was then allowed to cool to room temperature. Hydrogen peroxide (100 vol) was added at the rate of 2 ml per hour throughout the precipitation and subsequently cooled to maintain oxidation. The precipitate was filtered and washed four times with acid (6M hydrochloric acid, 55 ml) and once with water (25 ml). The washed precipitate was dissolved in Aqua Regia and analysed by ICP. The precipitate contained 0.34% ruthenium as a percent of the rhodium present (340 ppm ruthenium) which is an improved separation of rhodium.

We claim

1. A method for the separation of rhodium and/or iridium from a feedstock solution containing at least a ruthenium chloro-complex, hydrochloric acid and rhodium and/or iridium chloro-complexes, said method comprising converting the ruthenium chloro-complex to a nitrosyl complex in divalent state, and precipitating rhodium and/or iridium by manipulation of their oxidation states.

2. A method according to claim 1, wherein ruthenium is convened to the nitrosyl complex by treating the solution with formic acid, subsequently adding nitric acid, heating the solution to reflux, refluxing for 3 hours and treating with concentrated hydrochloric acid.

3. A method according to claim 1, wherein rhodium and/or iridium chloro-complexes are present in oxidation state III and are precipitated by complexing with a polyamine ligand.

4. A method according to claim 1, wherein the polyamine is DETA.

5. A method according to claim 4, wherein rhodium is precipitated by converting iridium (III) to iridium (IV), the solution is heated, a polyamine in 6N hydrochloric acid and an oxidising agent is added to the solution, the solution is cooled to ambient temperature and a rhodium salt is filtered from the solution.

6. A method according to claim 1, wherein iridium (III) is converted to iridium (IV) by oxidation with hydrogen peroxide.

7. A method according to claim 1, wherein the rhodium precipitation is carried out at an elevated temperature.

8. A method according to claim 1, wherein the solution is cooled to ambient temperature with the addition of hydrogen peroxide during precipitation.

* * * * *